United States Patent [19]

Bainard et al.

[11] 4,053,030
[45] Oct. 11, 1977

[54] PISTON SEAL AND RETURN SPRING

[75] Inventors: Dean R. Bainard, Clover, S.C.; Martin E. Benjamin, Gastonia, N.C.

[73] Assignee: Garlock Inc., Rochester, N.Y.

[21] Appl. No.: 720,696

[22] Filed: Sept. 7, 1976

[51] Int. Cl.² .................................................. F16D 65/54
[52] U.S. Cl. .............................. 188/71.8; 188/196 P; 188/216; 277/171
[58] Field of Search .............. 188/71.8, 196 P, 216; 277/170, 171

[56] References Cited

U.S. PATENT DOCUMENTS

| 2,938,609 | 5/1960 | Burnett | 188/196 P X |
| 3,155,200 | 11/1964 | Halibrand | 188/196 P |
| 3,377,076 | 4/1968 | Burnett | 188/196 P UX |
| 3,467,226 | 9/1969 | Belart | 188/196 P |
| 3,915,461 | 10/1975 | Gautier | 277/171 X |

Primary Examiner—Duane A. Reger
Attorney, Agent, or Firm—Schovee & Boston

[57] ABSTRACT

A seal for use on a disc brake piston/caliper assembly which seals the piston and also functions as a piston-return spring. The seal has a seal-retaining portion, a sealing lip portion, and a radially extending flex portion therebetween for retracting the piston by an amount equal to the flex portion retraction, thus automatically adjusting the piston position to compensate for normal pad wear. The seal can also include a locking flange and a separate pressure sealing lip to allow the seal to function without the previously required separate lathe cut sealing ring.

16 Claims, 3 Drawing Figures

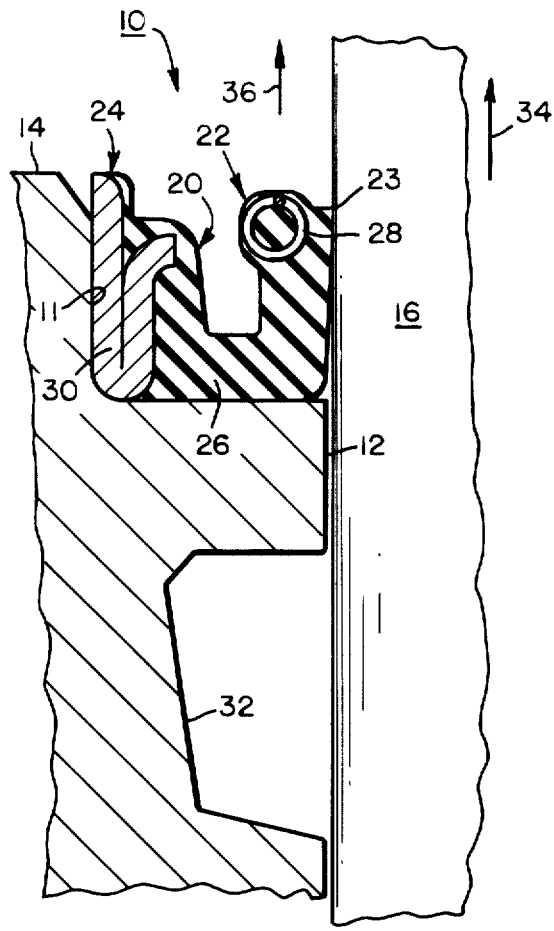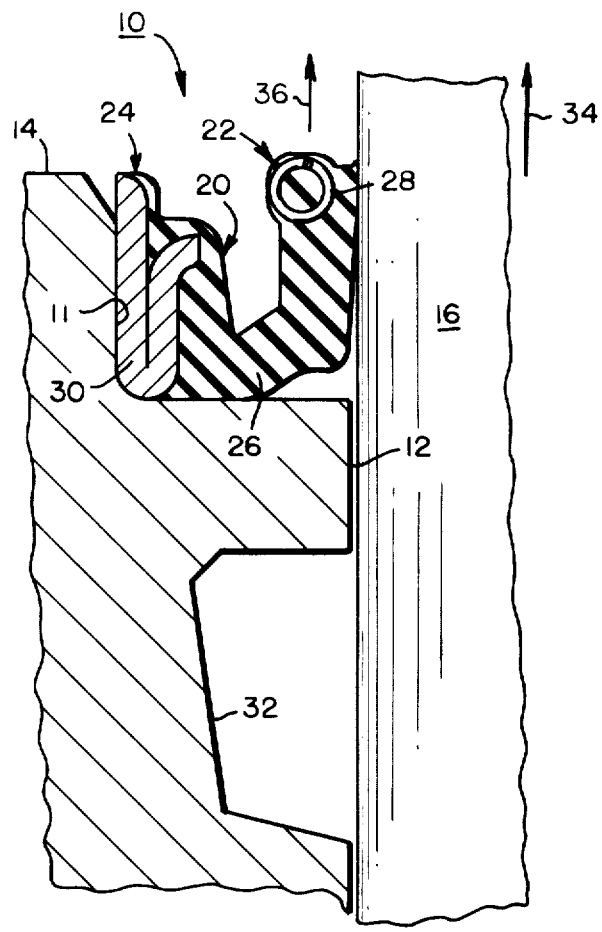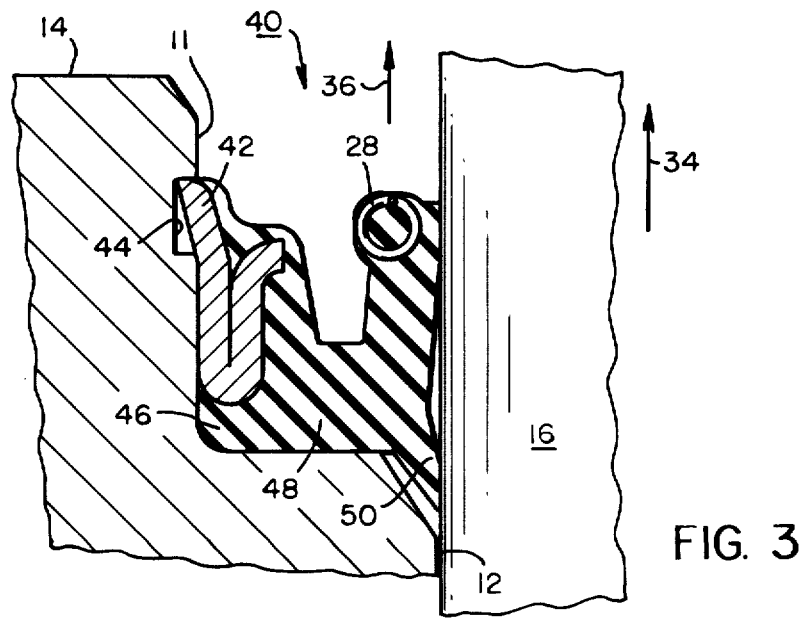

PISTON SEAL AND RETURN SPRING

BACKGROUND OF THE INVENTION

1. Field of the Invention

This invention relates to a seal for a disc brake piston/caliper assembly and in particular to such a seal that also functions as a return spring.

2. Description of the Prior Art

The prior art disc brake piston/caliper assembly uses a lathe cut ring in a groove in the I.D. of the caliper to seal pressure and uses a separate all rubber boot seal for excluding dirt and dust. Neither of these elements functions as a satisfactory piston-return spring, therefore, there is usually some drag caused by the pads continuing to rub against the disc. This drag causes premature wear of the pads and can also cause a loss in gas mileage of up to about three miles a gallon in a car equipped with four-wheel disc brakes.

It is therefore an object of the present invention to overcome the above-mentioned disadvantages of the prior art and to provide a less expensive, easier to install seal which requires less critical machining of the caliper, which also functions as a piston-return spring, and which automatically adjusts the piston position to compensate for normal pad wear.

SUMMARY OF THE INVENTION

A piston seal and return spring for use on a disc brake piston/caliper assembly including an elastomeric body having a seal retaining portion with a metal reinforcing shell that is a press fit in the bore of the caliper, a sealing lip portion with a garter spring therein, which sealing lip portion is a press fit on the shaft, and a radially extending flex portion connecting the seal retaining portion to the sealing lip portion. After the piston has moved during braking and the pressure is relieved, the flex portion causes the sealing lip portion and therefore also the piston to return to their "at rest" position, retracting the piston by an amount equal to the retraction of the flex portion, thus automatically adjusting the piston position to compensate for normal wear.

The seal of the present invention as installed in a bore of a caliper through which a piston extends must have the following parameters: (1) the force required to slide the piston through the sealing lip must be greater than the force required to flex the flex portion of the seal and less than both the force required to remove the seal from the caliper and the tensile strength of the elastomer of the flex area, and (2) the elastic memory of the flex portion must be sufficient to overcome any frictional residual fluid pressure resisting retraction of the piston.

The seal can also include a locking flange and a separate pressure sealing lip to allow the seal to function without the previously required separate lathe cut sealing ring.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 1 is a cross-sectional view of a seal according to the present invention in its "rest" position;

FIG. 2 is a cross-sectional view of the seal of FIG. 1 in its flexed or extended position; and FIG. 3 is a cross-sectional view of a seal of another embodiment of the present invention in its "rest" position.

DETAILED DESCRIPTION OF THE PREFERRED EMBODIMENTS

With reference now to the drawings, FIGS. 1 and 2 show one embodiment of a seal 10 according to the present invention which is installed as press-fit in a recess 11 of a bore 12 of a caliper 14 and which is also press-fitted over a piston 16 extending through the bore 12. The seal 10 comprises an annular elastomeric body 20 having a sealing lip portion 22 with a sealing lip 23, a seal retaining portion 24 spaced radially from the sealing lip portion 22, and an intermediate flex portion 26 extending between the sealing lip portion and the seal retaining portion.

A first reinforcing element, preferably a garter spring 28, is incorporated in the sealing lip portion 22 and a second reinforcing element, preferably a metal shell 30 formed in a tight U-shape, is incorporated in the seal retaining portion 24. FIG. 1 shows the seal 10 in its "rest" position with the O.D. of the shell 30 a press-fit in the bore 12 and with the lip 23 press-fitted in sealing position against the piston 16. This configuration for the seal 10 of the present invention is used in conjunction with the prior art lathe-cut ring (not shown) inserted in a groove 32 to retain pressure.

When the brakes are applied, the piston 16 moves outwardly (in the direction of the arrow 34) forcing the pads (not shown) against the disc (not shown). This movement causes the flex portion 26 to flex allowing the sealing lip portion 22 to move axially with the piston 16 for a limited distance indicated by the length of the arrow 36. The sealing lip portion 22 is shown in FIG. 2 in its "extended" position. As the pads wear, the piston 16 may move a greater distance (indicated, for example, by the longer length of the arrow 34) by sliding through the sealing lip 23 of the seal 10. When the pressure on the brakes is relieved, the elastomeric flex portion 26 tends to return to its "rest" position, thus retracting both the sealing lip portion 22 and also the piston 16 by the amount approximately equal to the length (but in the opposite direction) of the arrow 36. The following design factors involved are critical: (1) the force required to slide the piston 16 through the sealing lip 23 must be greater than the force required to flex the flex portion 26 and less than both the force required to remove the seal retaining portion 24 from the recess 11 of the caliper 14 and the tensile strength of the elastomer of the flex portion 26, and (2) the elastic memory of the elastomeric flex portion 26 must be sufficient to overcome any friction or residual fluid pressure resisting retraction of the piston 16.

FIG. 3 shows another embodiment of the present invention comprising a seal 40 which is similar to the seal 10 of FIGS. 1 and 2 except that the seal retaining portion is a slip fit rather than a press fit in the recess 11 and the seal 40 also includes a locking flange 42 adapted to snap into the lock into an annular groove 44 in the I.D. of the recess 11, an elastomeric (rubber) heel gasket 46, a thickened flex portion 48 and a separate pressure sealing lip 50. The caliper 14 has a chamfered surface to provide room for the lip 50. The changes made in the seal 40 from the seal 10 allow the seal 40 to function without the previously mentioned lathe-cut ring thus eliminating the need for the ring and also its associated groove 32 which provides a further cost savings.

The present invention has been described above in detail with respect to two preferred embodiments thereof, however, it will be noted that various modifications thereof can be made within the spirit and scope of the present invention. For example, other shapes & configurations of the flex portion 26, the sealing lip portion 22 and its reinforcing element 28, and the seal retaining portion 24 and its reinforcing element 30 can be used as long as they accomplish the same function.

What is claimed is:

1. An annular piston seal and return spring for a disc brake piston/caliper assembly comprising:
    a. an annular elastomeric body having a sealing lip portion including a sealing lip, a seal retaining portion spaced radially outwardly from said sealing lip portion, and an intermediate flex portion extending between said sealing lip portion and said seal retaining portion,
    b. a first reinforcing element incorporated in said sealing lip portion,
    c. a second reinforcing element incorporated in said seal retaining portion, and
    d. said sealing lip portion being axially moveable, with respect to said seal retaining portion, from its rest position to an extended position by the flexing of said flex portion, and said flex portion exerting a retracting force on said sealing lip portion when in its extended position tending to retract said sealing lip portion back to said rest position, whereby said sealing lip portion can move axially with a piston sealed thereby and can both seal and retract said piston.

2. The seal according to claim 1 wherein said first reinforcing element is a garter spring embedded in the elastomer of said sealing lip portion.

3. The seal according to claim 1 wherein said second reinforcing element is an annular metal shell having an O.D. adapted to press-fit in a bore.

4. The seal according to claim 3 wherein said first reinforcing element is a garter spring embedded in the elastomer of said sealing lip portion.

5. The seal according to claim 1 including a caliper having a bore and a piston extending through said bore, said retaining portion being mounted in a recess in said caliper bore and said sealing lip being in sealing engagement with said piston.

6. The seal according to claim 5 wherein the force required to slide said piston through said lip is greater than the force required to flex said flex portion and is less than the force required to remove said seal retaining portion from said caliper and is also less than the tensile strength of said flex portion.

7. The seal according to claim 6 wherein the elastic memory of said flex portion is sufficiently large to overcome friction and residual fluid pressure resisting retraction of said piston.

8. The seal according to claim 6 wherein said first reinforcing element is a garter spring embedded in the elastomer of said sealing lip portion.

9. The seal according to claim 6 wherein said second reinforcing element is an annular metal shell having an O.D. adapted to press-fit in a bore.

10. The seal according to claim 9 wherein said first reinforcing element is a garter spring embedded in the elastomer of said sealing lip portion.

11. The seal according to claim 1 wherein said second reinforcing element includes a flexible locking flange extending radially outwardly from the O.D. of said seal retaining portion.

12. The seal according to claim 1 including a separate pressure sealing lip on said sealing lip portion at the opposite axial end thereof from said sealing lip.

13. The seal according to claim 12 wherein said second reinforcing element includes a flexible locking flange extending radially outwardly from the O.D. of said seal retaining portion adjacent one axial end thereof, and an elastomeric gasket at the other end of said seal retaining portion.

14. The seal according to claim 13 including a caliper having a bore and a piston extending through said bore, said seal retaining portion being mounted in a recess in said caliper bore and said sealing lip being in sealing engagement with said piston.

15. The seal according to claim 14 wherein the force required to slide said piston through said lip is greater than the force required to flex said flex portion and is less than the force required to remove said seal retaining portion from said caliper and is also less than the tensile strength of said flex portion.

16. The seal according to claim 15 wherein the elastic memory of said flex portion is sufficiently large to overcome friction and residual fluid pressure resisting retraction of said piston.

* * * * *